US007231237B2

(12) United States Patent
Kinezos et al.

(10) Patent No.: US 7,231,237 B2
(45) Date of Patent: Jun. 12, 2007

(54) WIRELESS COMMUNICATION DEVICE WITH STRATEGICALLY POSITIONED ANTENNA

(75) Inventors: Christos L. Kinezos, Sunrise, FL (US); Jan-Ove U. Mattsson, Plantation, FL (US); Lorenzo A. Ponce De Leon, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 78 days.

(21) Appl. No.: 11/216,776

(22) Filed: Aug. 31, 2005

(65) Prior Publication Data

US 2007/0049364 A1 Mar. 1, 2007

(51) Int. Cl.
*H04M 1/00* (2006.01)

(52) U.S. Cl. .............................. 455/575.7; 455/575.1; 455/90.3; 455/552.1; 455/550.1; 455/25; 455/66.1; 379/433.01; 379/433.07; 343/702; 343/729

(58) Field of Classification Search ............ 455/550.1, 455/41.1–2, 25, 65, 552.1, 553.1, 575.1–7, 455/90.1–3, 128–129, 344, 66.1, 347–349, 455/63.1, 4; 379/428.01, 429, 433.01, 433.1, 379/440, 433.07; 343/700 MS, 702, 793, 343/803–804, 866, 741, 729
See application file for complete search history.

(56) References Cited

U.S. PATENT DOCUMENTS

| | | | | |
|---|---|---|---|---|
| 5,561,437 | A * | 10/1996 | Phillips et al. | 343/702 |
| 5,710,987 | A * | 1/1998 | Paulick | 455/575.7 |
| 5,809,433 | A * | 9/1998 | Thompson et al. | 455/575.7 |
| 6,016,126 | A * | 1/2000 | Holshouser | 343/702 |
| 6,529,749 | B1 * | 3/2003 | Hayes et al. | 455/575.7 |
| 6,735,630 | B1 | 5/2004 | Gelvin et al. | |
| 6,826,607 | B1 | 11/2004 | Gelvin et al. | |
| 6,832,251 | B1 | 12/2004 | Gelvin et al. | |
| 6,859,831 | B1 | 2/2005 | Gelvin et al. | |
| 6,885,880 | B1 * | 4/2005 | Ali | 455/575.7 |
| 2004/0233109 | A1 * | 11/2004 | Ying et al. | 343/700 MS |

* cited by examiner

*Primary Examiner*—Matthew D. Anderson
*Assistant Examiner*—Tuan Tran

(57) ABSTRACT

A wireless communication device (200) is provided, the wireless communication device (200) can include at least one antenna (240), the antenna (240) positioned beneath the face plate (252) and base plate (255) of a user interface (245) of the wireless communication device (200) in which the antenna (240) can be configured to communicate with a signal source.

19 Claims, 3 Drawing Sheets

WIRELESS COMMUNICATION DEVICE WITH STRATEGICALLY POSITIONED ANTENNA

BACKGROUND OF THE INVENTION

1. Field of the Invention

The present invention relates to antennas in a wireless communication device in general and global positioning system antennas used in the wireless communication device in particular.

2. Description of the Related Art

Conventional global positioning system (GPS) antennas are designed to have a strong directivity in the radiation pattern in the area directly facing the GPS satellites. Generally, the antenna rises out of the very top of the unit or is positioned near the top of the radio. Many times, a user will attempt to obtain a GPS fix by holding the mobile unit in a substantially horizontal position, which enables the user to better see the display. As such, the keypad and the antenna of the mobile unit will also be in a substantially horizontal position. As a result, the radiation pattern for the GPS antenna is not suited for this type of situation, which may have a significant impact on the ability of the mobile unit to get fast and accurate GPS fixes.

SUMMARY OF THE INVENTION

The present invention concerns a wireless communication device that can include at least one antenna. The antenna can be positioned beneath the face of a user interface of the wireless communication device in which the antenna can be configured to communicate with a signal source. The user interface can be positioned at a first surface of the wireless communication device. In one arrangement, the antenna can have a stronger signal reception when the wireless communication device is positioned in a first position, as compared to the antenna being positioned in locations of the wireless communication device different from the first surface. As an example, the user interface can be a keypad in which the antenna can be positioned between the face of the keypad and a base plate of the keypad.

In an embodiment of the invention, the antenna can include a resonator and a transformer feeder point operatively coupled to the resonator in which a predetermined gap can be maintained between the resonator and the transformer feeder point. As an example, operatively coupled can be a capacitive coupling between the resonator and the transformer feeder point.

As another example, at least a portion of the antenna can be substantially triangular in shape. In addition, the antenna can include one or more holes to accommodate one or more keypad buttons. The antenna can be a global positioning system antenna configured to at least receive global positioning system signals. In another arrangement, a Bluetooth antenna or a wireless local access network antenna can be positioned adjacent to the antenna.

The present invention also concerns a method of building a wireless communication device. The method can include the step of positioning at least one antenna beneath the face of a user interface of the wireless communication device in which the antenna is configured to communicate with a signal source. In addition, the antenna can include a resonator and a transformer feeder point operatively coupled to the resonator. As such, the method can further include the step of positioning the resonator a predetermined distance away from the transformer feeder point. The positioning step can further include embedding the antenna between the face plate of the user interface and a base plate of the user interface in which the user interface is a keypad of the wireless communication device. In another arrangement, the user interface can be positioned on a first surface of the wireless communication device, and the method can further include positioning the first surface in a first position to permit the antenna to at least substantially face the signal source. As an example, the signal source can be one or more global positioning system satellites.

The present invention also concerns a wireless communication device that includes at least one antenna in which the antenna can be positioned beneath a face of a keypad. The antenna can receive an enhanced signal when the face of the keypad is exposed towards a signal source. The structure of this antenna and the type of signals that it can receive may be similar to the antenna described above, although the invention is not necessarily so limited. In one arrangement, the antenna may include one or more holes to accommodate one or more keypad buttons.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

Figure 1:
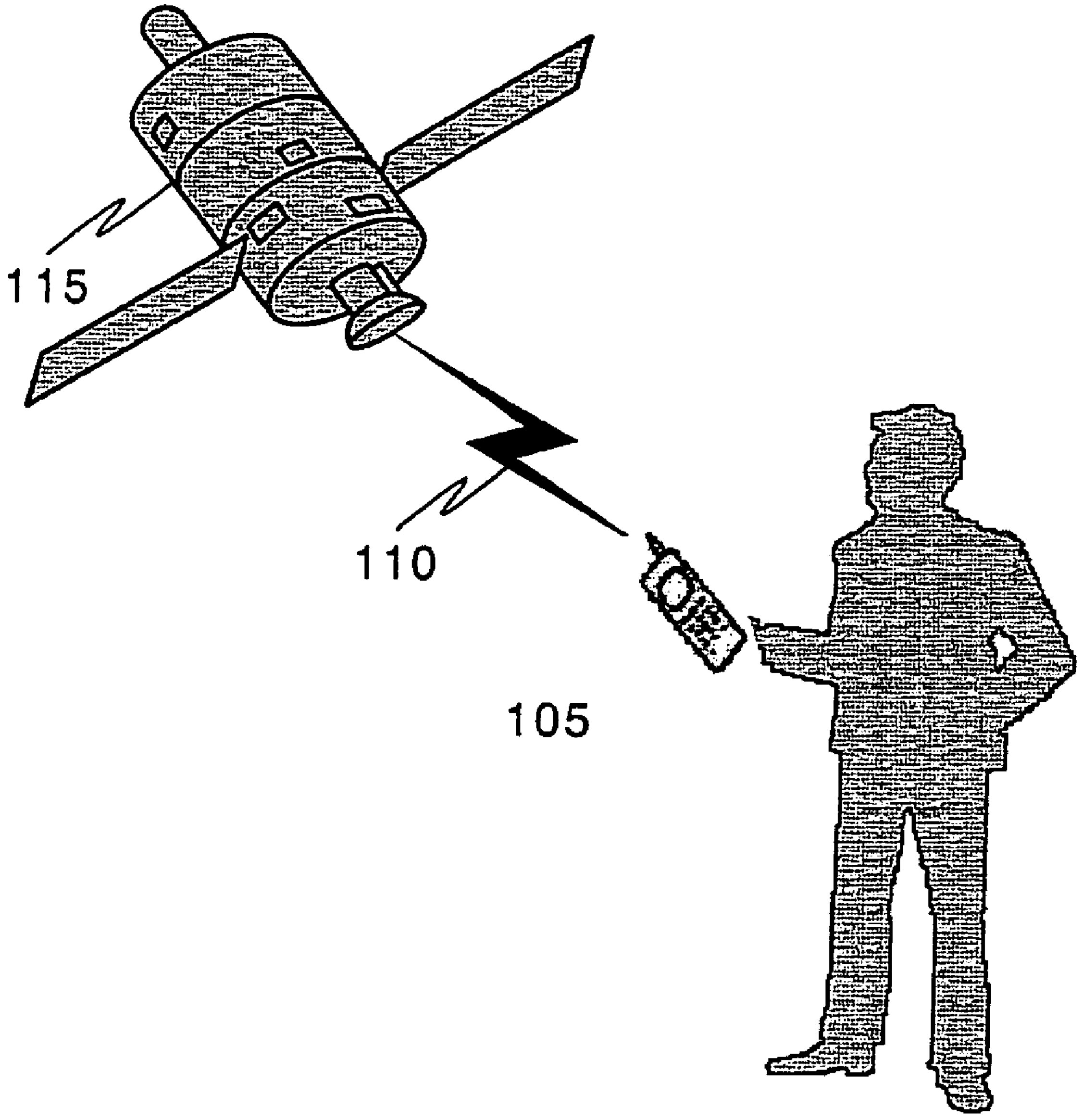
FIG. 1 illustrates a wireless communication device receiving signal reception from a transmitting station pursuant to an embodiment of the present invention.

While the specification concludes with claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "suppressing" can be defined as reducing or removing, either partially or completely.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A wireless communication device can receive signals from and transmit signals to base stations for data and voice communications using various antennas positioned within the wireless communication device. With increased connectivity, several wireless communication devices are Global Positioning System (GPS)-technology enabled. Several wireless communication devices specifically use GPS technology. Similarly, Bluetooth, infrared, and other communication technologies are enabled due to transmitter and receiver antennas embedded in the wireless communication device.

Generally, the position of the antenna is determined based on a direction of the signal reception. For example, known data and voice communication antennas on wireless communication devices are positioned on top of the wireless communication device to receive signals from all possible directions. The position of the antenna plays an integral role in receiving and transmitting an enhanced signal. An enhanced signal provides better quality for the user. For example, an antenna with a radiation pattern pointing to the transmission source enables the wireless communication device to receive an enhanced signal as opposed to an antenna that is embedded deep within the wireless communication device. Often, the visual display unit can also provide interference with signal reception if the antenna is positioned close to the visual display unit.

The present invention can improve the ability of a wireless device to receive certain signals, such as GPS signals, because an antenna that can capture such signals can be strategically positioned to do so. As an example, the antenna can be positioned beneath a user interface, such as a keypad, which can cause the radiation pattern of the antenna to be better suited for the reception of GPS signals from GPS satellites when a user holds the wireless device in a substantially horizontal position to obtain a GPS fix.

Turning now to FIG. 1, a user with a wireless communication device 105 is shown. In one embodiment, the wireless communication device 105 can be GPS-enabled and can receive signals from a transmitting station 115 as well as voice and data signals from a base station 110 on the ground. The transmitting station 115 can also be a satellite. The user also receives data and voice signals from the base station 110. In one arrangement (although not shown here), the wireless communication device 105 can include a GPS antenna that can be positioned beneath a user interface of the wireless communication device 105, such as a keypad. Positioning the GPS antenna beneath the user interface provides an enhanced signal to the user when the GPS enabled wireless communication device is placed in a navigation mode. A navigation mode on a GPS enabled-wireless communication device is a mode where the wireless communication device is held to enable a user to obtain positional information. In many instances, a user will position the wireless device 105 in a substantially horizontal position, with respect to the ground. At this point, the keypad on most mobile devices will be pointing substantially upwards towards the open sky.

As noted earlier, the user interface can be a keypad, and hence the antenna can be positioned between a face of the keypad and a base plate of the keypad of the wireless communication device 105, as will be shown later. Positioning the antenna in this manner can provide a stronger signal reception as the wireless communication device 105 is placed in the navigation mode. The reception of these signals is enhanced because the antenna may be facing or at least substantially facing the signal source, such as one or more of the transmitting stations 115, which also can cause the radiation pattern of the antenna to be directed to the signal source.

The signal reception can be enhanced in relation to the antenna being positioned in certain other locations of the wireless communication device 105, such as at the top of the wireless communication device 105. Those skilled in the art shall appreciate, however, that the antenna can be positioned in other suitable locations (other than underneath the user interface) to improve the chances that the radiation pattern of the antenna may be directed towards the signal source. Additionally, the antenna may not be restricted to a GPS antenna. Any antenna receiving and/or transmitting radio frequency signals may be positioned beneath the user interface to provide a better signal reception. For example, positioning a Bluetooth antenna or a wireless local area network (WLAN) beneath the user interface will reduce the interference that may be experienced from the visual display unit and therefore provide enhanced signal reception.

Figure 2:
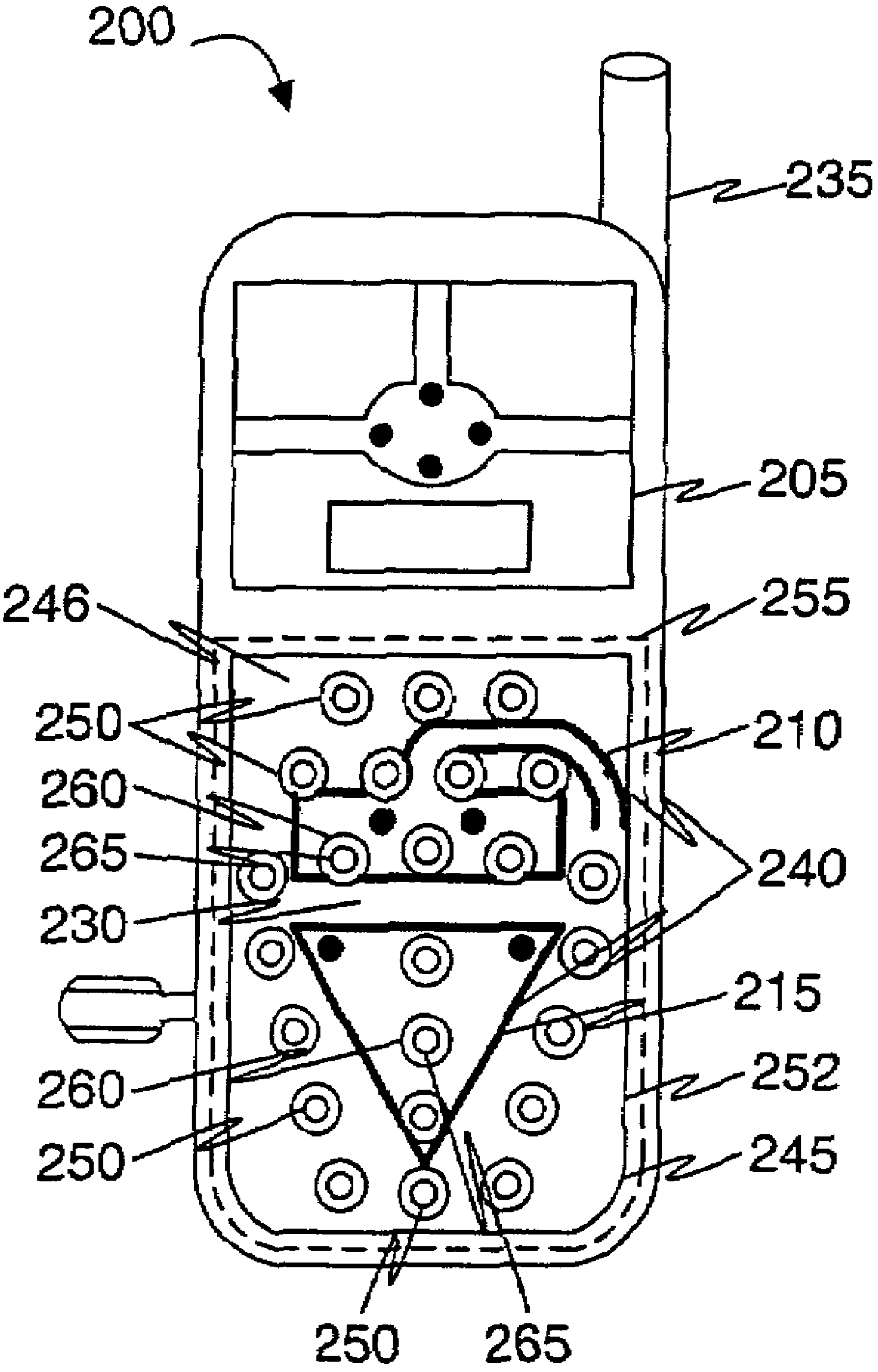
FIG. 2 illustrates a wireless communication device with a faceplate showing an antenna as per an embodiment of the present invention.

Turning now to FIG. 2, a wireless communication device 200 (similar to the wireless communication device 105 of FIG. 1) is shown comprising an antenna 240, according to one embodiment of the present invention. The wireless communication device 200 can include a visual display unit 205 and a user interface 245, which can be a keypad 246 having one or more keypad buttons 250. The keypad 246 can include a faceplate 252 and a base plate 255, which is represented by a dashed outline. In one arrangement, the antenna 240 can be placed between the faceplate 252 and the base plate 255 of the user interface 245 (or keypad 246). The base plate 255 can be positioned above a printed circuit board (PCB) (not shown), and the antenna 240 can rest on a top surface of the base plate 255. Alternatively, the antenna 240 can rest on an inner surface of the faceplate 252. Those of skill in the art, however, will appreciate that the antenna 240 does not necessarily have to be positioned between the face plate 252 and the base plate 255, as other locations may be suitable.

The antenna 240 can further include a transformer feeder point 210 and a resonator 215. The resonator 215 can contact a ground point (not shown) and the transformer feeder point 210 can contact a transmission line (not shown). As an example, the transmission line can have a characteristic impedance approximately equal to 50 ohms. In one arrangement, a gap 230 can exist between the resonator 215 and the transformer feeder point 210. A change in the location of the ground point may affect the performance of the antenna 240, but the location of the transformer feeder point 210 can be changed without necessarily affecting the functioning of the antenna 240.

As is known in the art, the transformer feeder point 210 can transmit and/or receive radio frequency signals to and from the resonator 215. The resonator 215 and the transformer feeder point 210 can resonate at an operating frequency. As an example, the operating frequency can include but is not limited to GPS signals, which may have a frequency of approximately 1.575 GHz, with deviations above and below that value. Of course, those of skill in the art will appreciate that the invention is not so limited, as the antenna 240 may resonate at any other suitable operating frequencies.

According to an exemplary embodiment of the present invention and as noted earlier, the antenna 240 can be positioned between the base plate 255 and the faceplate 252 of the keypad 246. As an example, the antenna 240 can be manufactured thin enough to fit in the space between the base plate 255 and the face plate 252 of the keypad 246. Moreover, because of where it is positioned in this particular arrangement, the antenna 240 can be located away from the visual display unit 205. Hence, the interference from the visual display unit 205 may not affect the functioning or operating characteristics of the antenna 240.

As noted earlier, a gap 230 can exist between the resonator 215 and the transformer feeder point 210, which means that the resonator 215 and the transformer feeder point 210 can be capacitively coupled. The length of the gap 230 can vary, depending on design requirements. Of course, the invention is not limited in this regard, as the transformer feeder point 210 and the resonator 215 can be physically coupled to one another, if so desired.

According to one embodiment of the present invention, the resonator 215 can be substantially triangular in shape, although the resonator 215 can be in any other suitable shape. As such, the bottom of the resonator 215 can taper, and the tip of the resonator 215 can be connected to a ground point (not shown) of the PCB (the base plate 255 can be configured to allow this connection). In another arrangement, the antenna 240 can be kept relatively thin by not incorporating a dielectric substance on the antenna 240. By avoiding such a dielectric substance, the antenna 240 can more easily fit between the base plate 255 and the face plate 252. Air gaps between the antenna 240 and the base plate 255 and the face plate 252 can serve as a suitable substitute for such a dielectric substance.

In one arrangement, the antenna 240 can include one or more openings 260. These openings 260 can be in the transformer feeder point 210 or the resonator 215 or both. In one arrangement, the openings 260 can receive one or more buttons 265, such as the keypad buttons 250, which can permit the buttons 265 to pass from the PCB to the outside of the face plate 252, where they can be conventionally accessed by a user. This button 265 can include all the components necessary to receive a user's input and to transfer the input to the PCB. It has been shown, however, that these openings 260 do not substantially affect the performance of the antenna 240, as it is still able to resonate in the desired frequencies. It should be noted that the openings 260 are not limited to receiving the buttons 265, as other suitable components can pass through the openings 260.

The antenna 240 provided in the present invention can also be used as a secondary antenna along with a main subscriber antenna 235. As an example, the antenna 235 can be used to transmit and receive conventional communications signals, such as wireless voice and data signals at various frequencies. In addition, the antenna 240, in its capacity as a secondary antenna, can enable the wireless communication device 105 to receive (or even transmit) GPS signals, without interfering with the operation of the main subscriber antenna 235. Similarly, the main subscriber antenna 235 will not affect the operation of the antenna 240.

Again, it must be stressed that the antenna 240 is not limited a GPS antenna, as the antenna 240 can be configured to receive and/or transmit other signals, such as Bluetooth or WLAN frequencies.

In another arrangement, other types of antennas may be positioned near or adjacent to the antenna 240. For example, a Bluetooth antenna or a WLAN antenna can be placed near the antenna 240 without affecting the operation of either antenna. These additional antennas, in view of their high resonating frequencies, can be made relatively small and can even be positioned on, for example, the inner surface of the face plate 252 or some other suitable surface.

Figure 3:
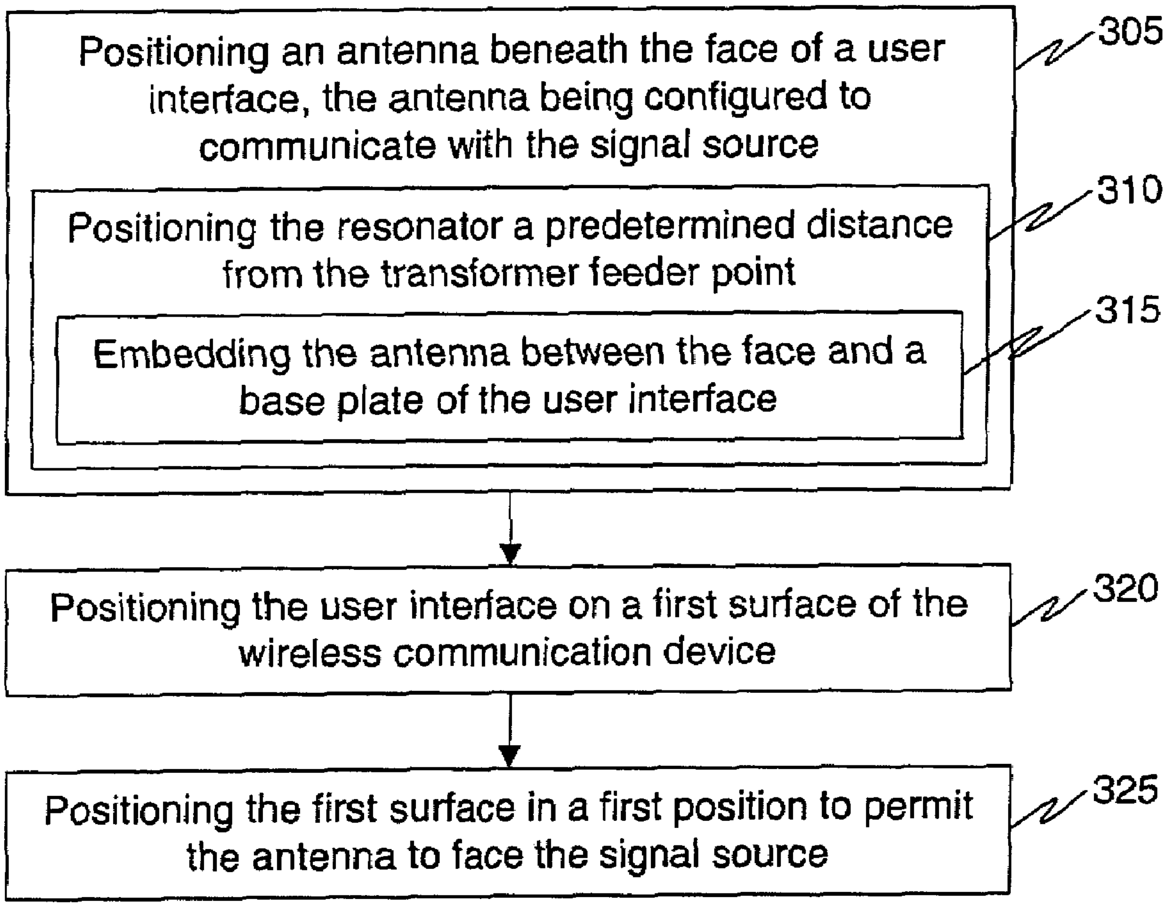
FIG. 3 illustrates a method of building a wireless communication device having a strategically positioned antenna according to one embodiment of the present invention.

Turning now to FIG. 3, a method of building a wireless communication device is shown, according to one embodiment of the present invention. The method comprises the step of positioning an antenna beneath the face of a user interface of a wireless communication device in a manner that enables the antenna to communicate effectively with a signal source, as shown at step 305. As such, the user interface can be positioned on a first surface of the wireless communication device, as shown at step 320.

In addition, at step 325, the first surface can be positioned in a first position to permit the antenna to face the signal source. For example, the antenna can be a GPS antenna, and when a user puts the wireless device in a navigation mode, the antenna can face the signal source, which can be one or more GPS satellites. In this example, the first surface can be a surface of the base plate 255 or the face plate 252. This process can result in the radiation pattern of the antenna being directed to the signal source. Further, this radiation pattern may not include any nulls in the navigation mode. By positioning the antenna in this way, the reception of the GPS signals can be enhanced, as compared to having the GPS signals received at an antenna that is positioned near the top of the wireless device, such as the main subscriber antenna 235 of FIG. 2.

As per one embodiment, the user interface can be a keypad, and hence the antenna can be embedded between a faceplate of the keypad and a base plate of the keypad, as shown at step 315. Positioning the antenna beneath the user interface can further include positioning a resonator of the antenna at a predetermined distance from a transformer feeder point of the antenna, as shown at step 310. Of course, other methods of positioning the antenna beneath a user interface of the wireless device are within contemplation of one or more of the inventive arrangements.

Prior art antennas have poor efficiency in the navigation mode when held substantially parallel to a signal source. For example, a GPS-enabled wireless communication device used in the navigation mode shall provide less signal reception when the GPS antenna is not in a position that faces the signal source, for example, one or more GPS satellites. In the present invention, placing the antenna beneath the user interface, or a keypad, facilitates the reception of the radio frequency signals when the keypad of the wireless communication device is held facing the signal source, which is a position where most users hold the wireless device when attempting to obtain GPS or location information. An enhanced signal can be understood as a stronger signal reception on the wireless communication device when the antenna is positioned on a first surface or location as compared to the antenna being positioned on a second, less desirable surface or location.

Where applicable, the present invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present invention may also be embedded in a computer program product, which comprises all the features enabling the implementation of the methods described herein and which when loaded in a computer system, is able to carry out these methods.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A wireless communication device, the wireless communication device comprising:

at least one antenna, the antenna positioned beneath a face of a user interface of the wireless communication device wherein the antenna is configured to communicate with a signal source;

wherein the antenna includes one or more holes in the antenna to accommodate one or more keypad buttons.

2. The wireless communication device of claim 1, wherein the user interface is positioned at a first surface of the wireless communication device and the antenna has a stronger signal reception when the wireless communication device is positioned in a first position as compared to the antenna being positioned in locations of the wireless communication device different from the first surface.

3. The wireless communication device of claim 1, wherein the user interface is a keypad, wherein the antenna is positioned between a face of the keypad and a base plate of the keypad.

4. The wireless communication device of claim 1, wherein the antenna comprises:

a resonator; and a transformer feeder point operatively coupled to the resonator, wherein a predetermined gap is maintained between the resonator and the transformer feeder point.

5. The wireless communication device of claim 4, wherein operatively coupled comprises a capacitive coupling between the resonator and the transformer feeder point.

6. The wireless communication device of claim 1, wherein at least a portion of the antenna is substantially triangular in shape.

7. The wireless communication device of claim 1, wherein the antenna is a global positioning system antenna configured to at least receive global positioning system signals.

8. The wireless communication device of claim 1, wherein a Bluetooth antenna or a wireless local access network antenna is positioned adjacent to the antenna.

9. A method of building a wireless communication device, the method comprising:

positioning at least one antenna beneath a face of a user interface of the wireless communication device, wherein the antenna is configured to communicate with a signal source;

wherein the antenna includes one or more holes in the antenna to accommodate one or more keypad buttons.

10. The method of claim 9, wherein the antenna comprises:

a resonator; and a transformer feeder point operatively coupled to the resonator.

11. The method of claim 10, further comprising positioning the resonator a predetermined distance away from the transformer feeder point.

12. The method of claim 11, wherein the positioning step further comprises embedding the antenna between a face plate of the user interface and a base plate of the user interface, the user interface being a keypad of the wireless communication device.

13. The method according to claim 9, wherein the user interface is positioned on a first surface of the wireless communication device and the method further comprises positioning the first surface in a first position to permit the antenna to at least substantially face the signal source.

14. The method according to claim 9, wherein the signal source is one or more global positioning system satellites.

15. A wireless communication device, the wireless communication device comprising:

at least one antenna, the antenna positioned beneath a face of a keypad wherein the antenna receives an enhanced signal when the face of the keypad is exposed towards a signal source;

wherein the antenna includes one or more holes in the antenna to accommodate one or more keypad buttons.

16. The wireless communication device of claim 15, wherein the antenna comprises:

a resonator; and a transformer feeder point operatively coupled to the resonator, wherein a predetermined amount gap is maintained between the resonator and the transformer feeder point.

17. The wireless communication device of claim 16, wherein operatively coupled comprises a capactitive coupling between the resonator and the transformer feeder point.

18. The wireless communication device of claim 15, wherein at least a portion of the antenna is substantially triangular in shape.

19. The wireless communication device of claim 15, wherein the antenna is a global positioning system antenna configured to at least receive global positioning system signals.

* * * * *